Figure 7:
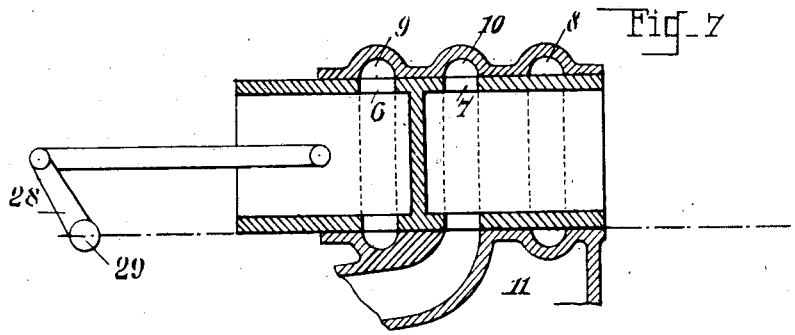

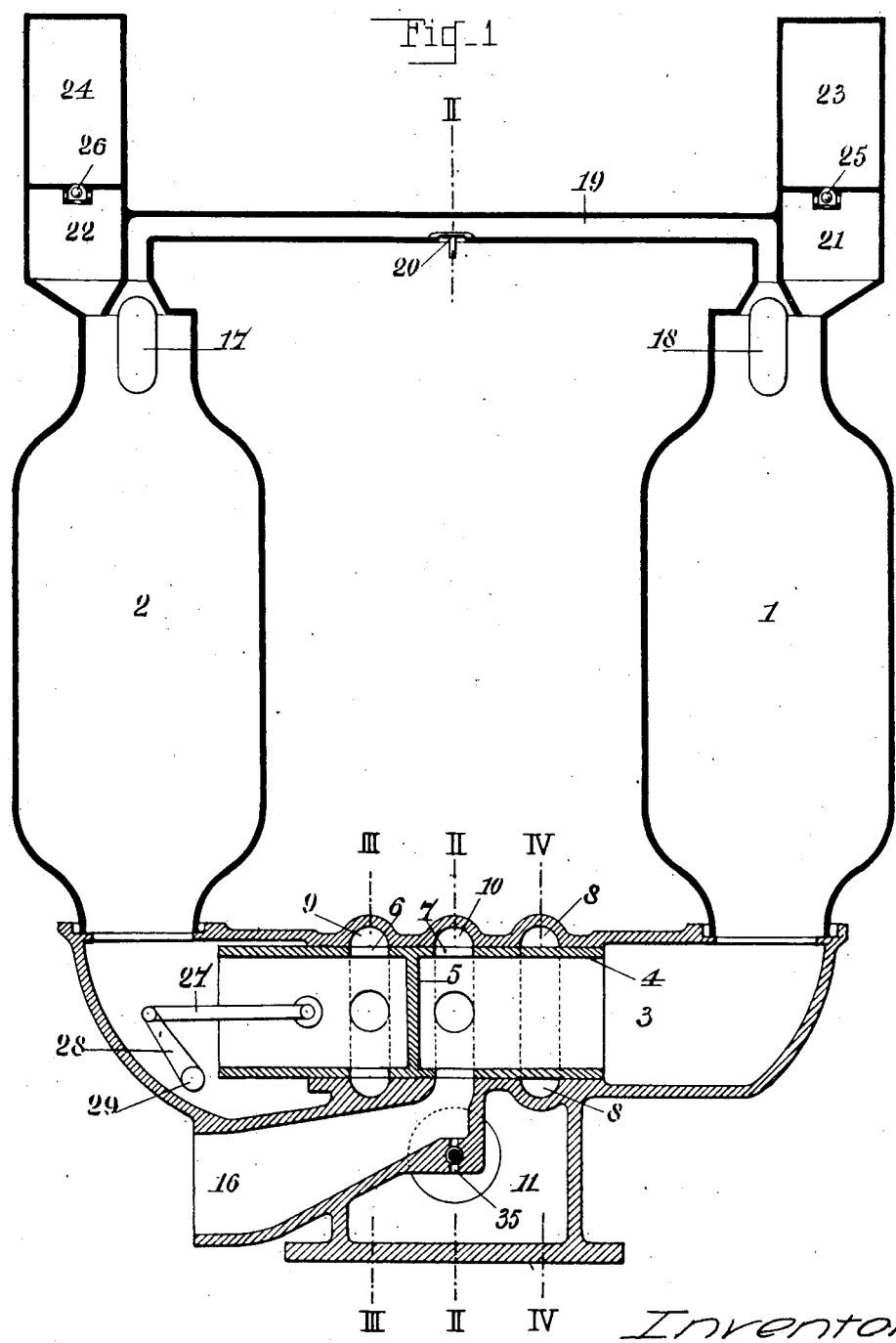

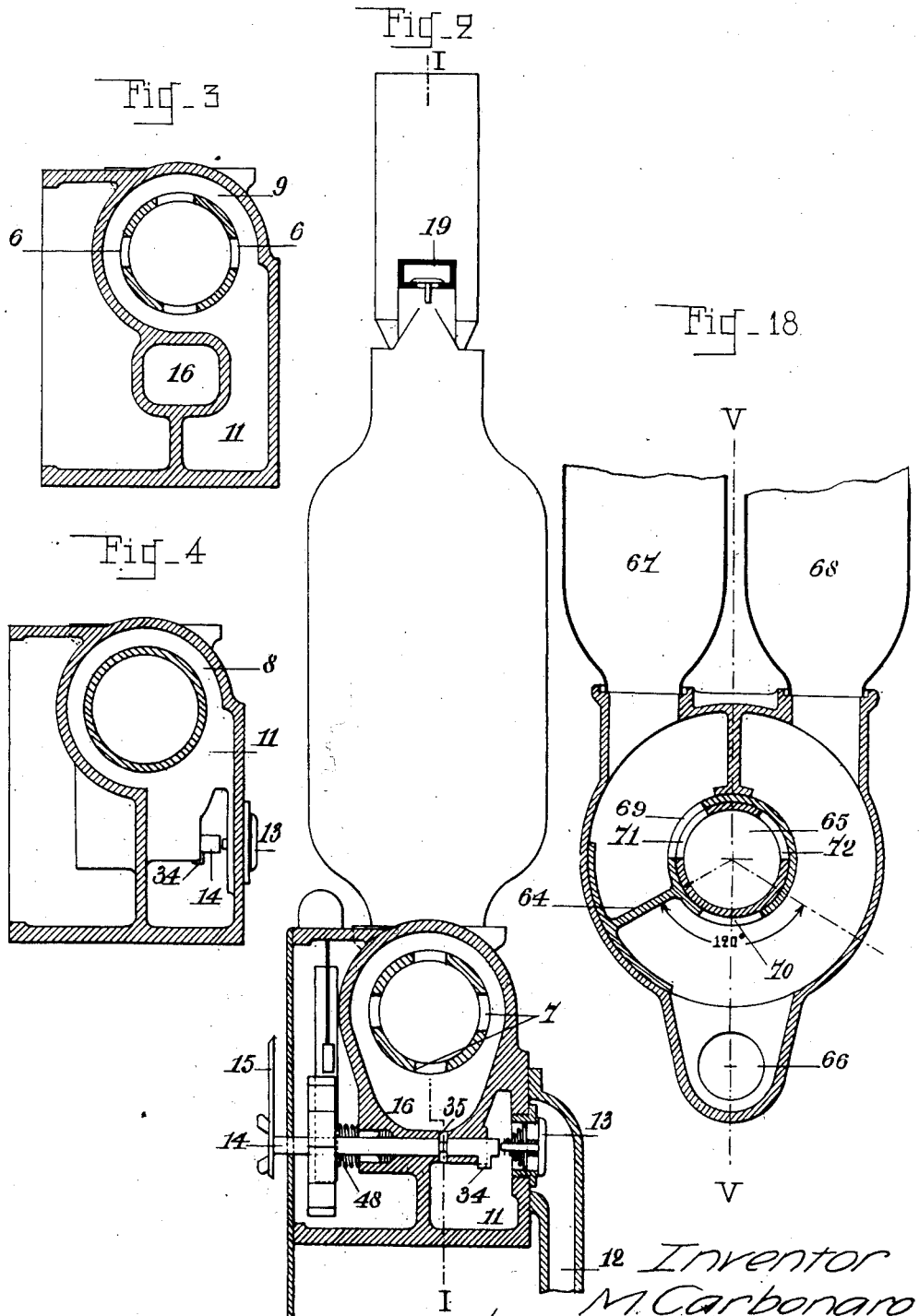

June 2, 1931.  M. CARBONARO  1,808,734
LIQUID METER
Filed March 15, 1926   7 Sheets-Sheet 3
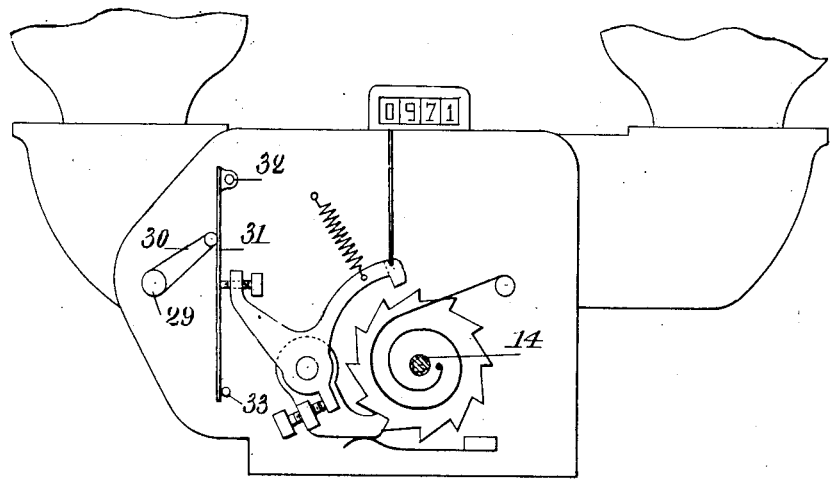
Fig_5
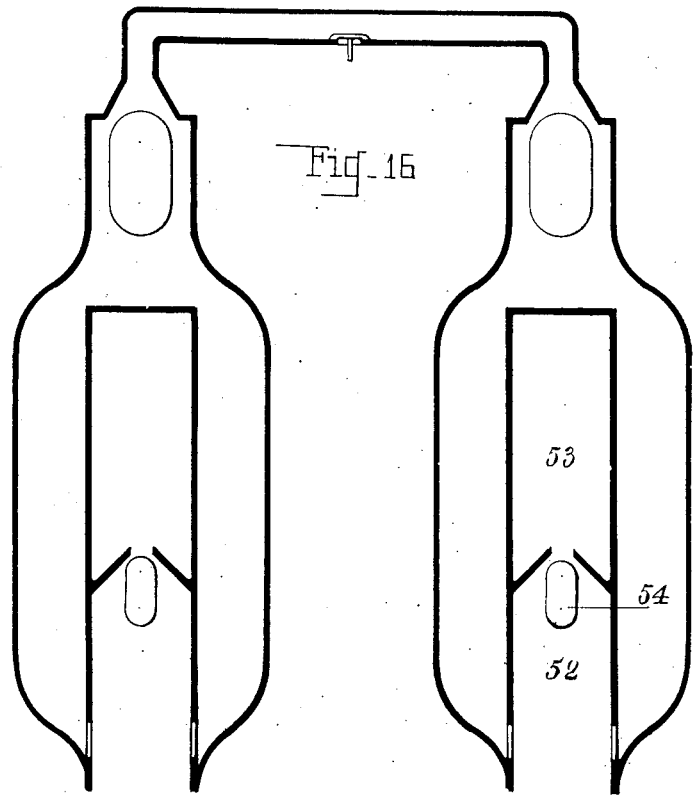
Fig_16
Inventor
M. Carbonaro
by Langner, Parry, Card & Langner
Attys

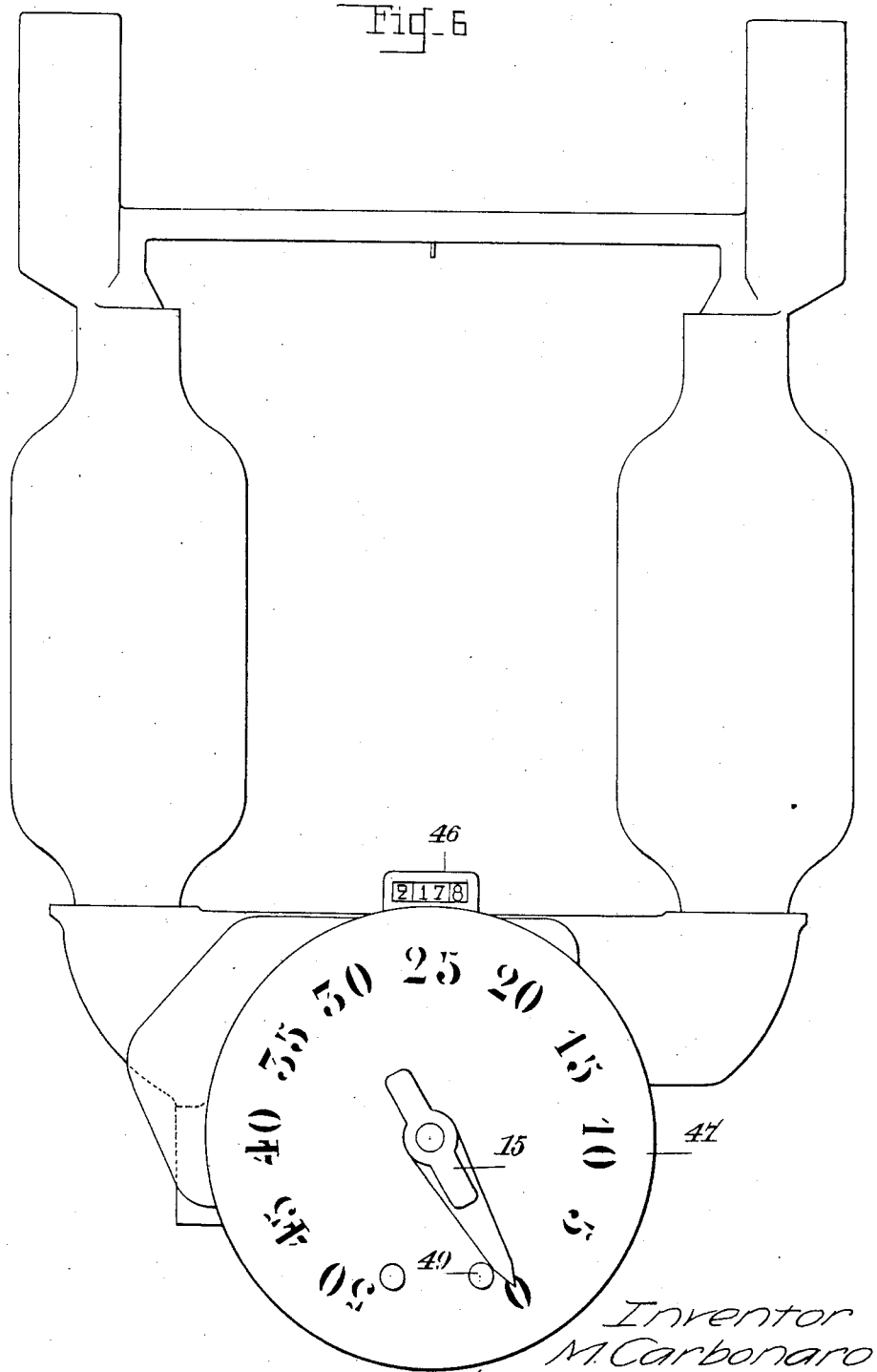

June 2, 1931.   M. CARBONARO   1,808,734
LIQUID METER
Filed March 15, 1926   7 Sheets-Sheet 5

Inventor
M. Carbonaro
by Langner, Parry, Card & Langner
Attys

Inventor
M. Carbonaro
by Langner, Parry, Card & Langner
Atty's

June 2, 1931. M. CARBONARO 1,808,734
LIQUID METER
Filed March 15, 1926 7 Sheets-Sheet 7
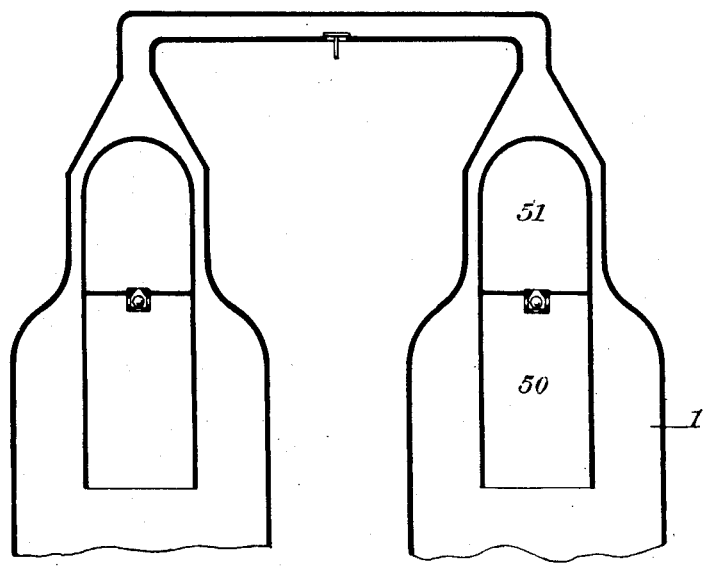
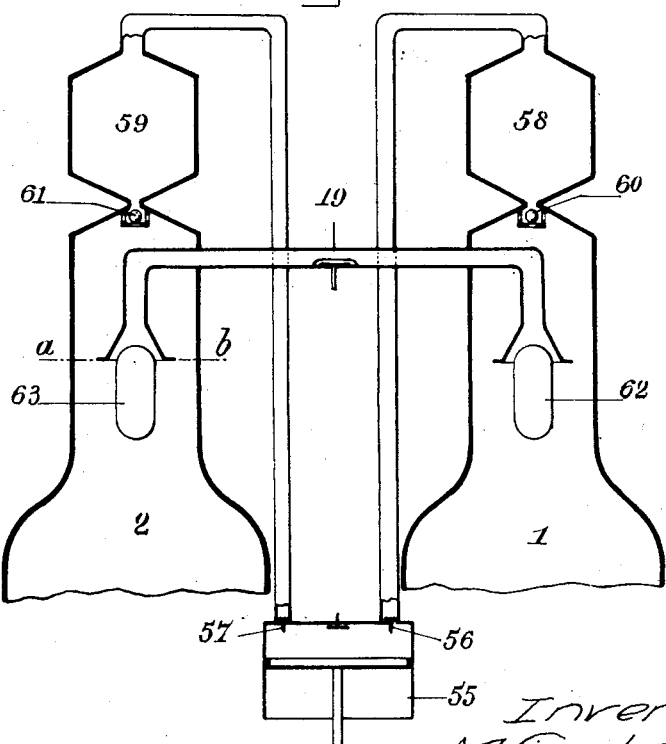
Inventor
M. Carbonaro
by Langner, Parry, Card & Langner
Atty's Patented June 2, 1931

1,808,734

UNITED STATES PATENT OFFICE

MARIO CARBONARO, OF PARIS, FRANCE

LIQUID METER

Application filed March 15, 1926, Serial No. 94,935, and in France April 10, 1925.

In known liquid meters of the automatic type comprising two measuring chambers utilizing the feeding pressure of the liquid to operate the reversing valve, the reversing elements are actuated from the dead centre to the ends of their stroke by spring-operated means, and in this manner the mechanism of the apparatus offers considerable complication.

This invention consists in a liquid meter which comprises two combined measuring chambers of equal capacity, and wherein the valve gear for the alternate connection of said measuring chambers with the feeding and the discharge conduits is controlled by the expansion of air contained in two auxiliary chambers, termed compression chambers, the air being previously compressed by the liquid itself which is supplied to the said measuring chambers.

The invention further relates to various particular forms of construction of the said apparatus and the details of the same, as follows:

First, the combination of two auxiliary chambers termed compression chambers, with a single valve element of the sliding or the pivoting type coacting with the two measuring chambers, said element preferably consisting of a double-acting piston which also serves as a four-way slide valve.

Secondly, various constructional forms of the said compression chambers which are either stationary and situated within or without the measuring chambers, or movable and serving as floats.

Thirdly, the combination with the two measuring chambers and their compression chambers of intercommunicating means, which are known per se, but are herein automatically closed by suitable devices (such for instance as floats) when the liquid attains a certain level in one of the measuring chambers, so as to cut off the second chamber at this time and to provide for the automatic formation of a reserve supply of compressed air in the compression chambers.

Fourthly, the utilization of the feeding pressure of the liquid in order to form a reserve supply of compressed air whose expansion will serve chiefly to impel the valve element to the end of its stroke.

Fifthly, the combination with the compression chambers used for the storage under pressure of the air existing in the measuring chambers, of an external source of compressed air, this air being supplied by suitable means, for instance by an air pump mounted in co-operation with the liquid pump.

Sixthly, the use of draining means whereby the valve box is emptied as far as a certain level at the end of each operative period of the apparatus, this emptying being preferably performed in an automatic manner under the control of the indicating pointer.

Finally, the said invention comprises various details of construction and special combinations of elements whereby the invention may be suitably carried into effect.

By way of example which is not of a limitative nature the appended drawings show a constructional form of a complete apparatus (Figs. 1 to 14) and three modifications concerning the disposition of the auxiliary compression chambers (Figs. 15, 16 and 17), with reference to the following description.

Fig. 1 is a section on the line I—I of Fig. 2 and Fig. 2 is a section on the line II—II of Fig. 1. Fig. 3 is a section on the line III—III of Fig. 1. Fig. 4 is a section on the line IV—IV of Fig. 1. Fig. 5 is a front view of the lower part of the meter, the indicating dial being removed in order to show the mechanism therein. Fig. 6 is a front elevation of the apparatus. Figs. 7, 8, 9, and 10 show four successive positions of the valve element, representing its successive positions during the functioning. Figs. 11, 12, 13 and 14 show the four corresponding positions of the parts of the servo-meter. Figs. 15, 16 and 17 show three different forms of the compression chambers. Fig. 18 shows a modification of the valve element.

Referring to Figs. 1 and 2, the said meter essentially comprises two measuring chambers 1 and 2 of equal capacity which are connected together at the bottom by the horizontal conduit 3 in which is movable the piston valve 4; the latter is provided on either side of the vertical partition 5, placed at the middle, with the ports 6 and 7 which according to the position of the valve will be in or out of coincidence with the annular chambers 8, 9, 10 surrounding the walls of the conduit cylinder 3.

The chambers 8 and 9 communicate with a liquid inlet chamber which is supplied with liquid by the pipe 12 connected with a feed pump. The flow of the liquid from the pipe 12 into the chamber 11 is controlled by a valve 13 which is under the direct control of the shaft 14, said shaft being secured to the indicating pointer 15. The central chamber 10 communicates with a discharge conduit 16 for discharging the measured liquid.

At the upper part of each of the measuring chambers 1 and 2 is disposed a float 17 or 18 respectively which may be raised by the liquid in order to close the ends of a pipe 19 which connects the said measuring chambers together at the top, said pipe being provided with an atmospheric inlet valve 20. Adjacent the said floats are the auxiliary receivers or chambers 21 and 22, forming parts of the respective measuring chambers or receptacles, each of which is connected at the top with the respective compression chambers 23, 24 from which they are separated by a wall having an aperture therein, said aperture serving in each case as the seating for one of the balls 25, 26 which are adapted to close the said aperture.

The valve 4 actuates through the medium of a rod 27 and a crank 28 the shaft 29 which traverses the walls of the conduit 3 and actuates the crank arm 30 (Fig. 5); the end of said arm is provided with a roller coacting with a spring strip 31 which is pivoted at its upper end 32 and is in contact at its lower end with a stud 33.

Fig. 3 shows the manner in which the chamber 11 communicates with the annular chamber 9 co-operating with the valve ports 6. Fig. 4 shows the communication between said chamber and the annular chamber 8; herein the valve 13 is shown in elevation, as well as the end of the shaft 14 controlling said valve, and also the locking stud 34 for the said shaft, which engages in a suitable notch whereby the shaft 14 will be locked when the pointer 15 is at the zero position on the dial.

Fig. 5 shows the connection between the shaft 29 and the registering mechanism, this connection forming the subject of the co-pending application No. 94,936, filed at the same date as the present application. Figs. 11 to 14 show the different positions of the connection spring strip and relative positions of the servo-motor, the working of which is described in the above mentioned application.

Referring to Fig. 2, the vertical aperture 35 connects the chamber 16 with the chamber 11; said aperture will coincide with a groove in the shaft 14 when the latter is locked at the zero point, with the stud 34 engaging the above mentioned groove. If the shaft 14 is impelled so as to open the valve 13 and to release the stud 34 from its notch, the groove in the said shaft will no longer coincide with the aperture 35, so that the latter will be closed by the shaft itself.

The operation of the said apparatus is as follows:

When the feed valve 13 is opened by pushing upon the pointer 15, the liquid under pressure will enter the chamber 11 and will proceed thence into the annular chambers 8 and 9. The chamber 8 will offer no outlet, but the liquid in the chamber 9 will flow through the ports 6 of the said piston valve and thence through the interior of the valve, and will thus fill the corresponding measuring chamber, as the liquid rises therein, the air will be expelled from the chamber through the conduit 19 into the second chamber.

When the liquid reaches the float 17, the latter will rise and will thus close the air discharge passage; the liquid continues to rise, and enters the chamber 22; the air in the said chamber will be expelled through the aperture controlled by the ball 26 into the compression chamber 24; when the liquid reaches the said ball, it will raise the ball, thus closing the said aperture.

At this time, the liquid has been brought into a chamber which is closed on all sides, and this will produce a great excess of pressure which acts upon the vertical partition 5 of the said piston valve. The valve will now be moved to the right until by reason of the sliding motion the ports 6 cease to communicate with the chamber 9, thus cutting off all access of the liquid to the measuring chamber 2. It is apparent that at this moment the apparatus will be at one dead point but, by referring to Figs. 7, 8, 9 and 10 as well as to Figs. 11, 12, 13 and 14, it will be noted that due to the motion of the arms 28 and 30, both of which are keyed to the shaft 29, the spring 31 will now have yielded, but its action upon the shaft 29 is very weak, as the effort of the said spring upon the arm 30 is exercised in a direction which very nearly coincides with a line passing through the axis of the shaft perpendicular to the spring.

The displacement of the piston valve 4 caused by the overpressure of the liquid produced by filling the measuring chamber and auxiliary chamber is insufficient and it is necessary to use a supplementary force. This force or effort is obtained by the expansion of the air which has been compressed in the chamber 24. Due to this expansion, the liquid in the chamber 22 will be expelled into the measuring chamber at a pressure equal to the pressure which the air attained at the end of the compression stroke when the ball 26 entered into action.

Figure 8:
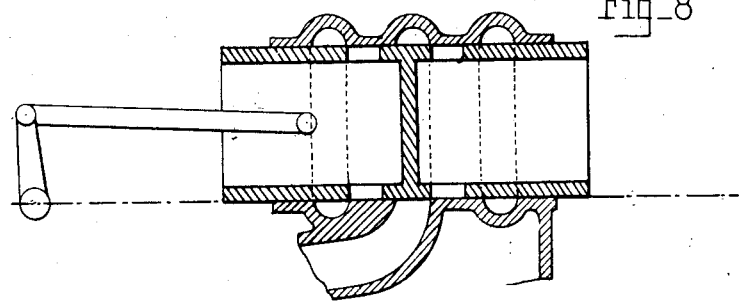
Figure 9:
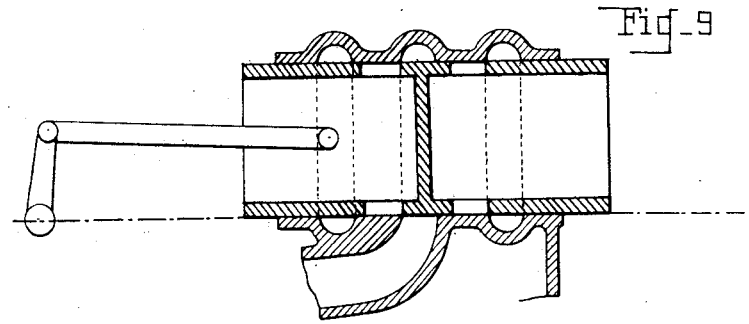
Figure 10:
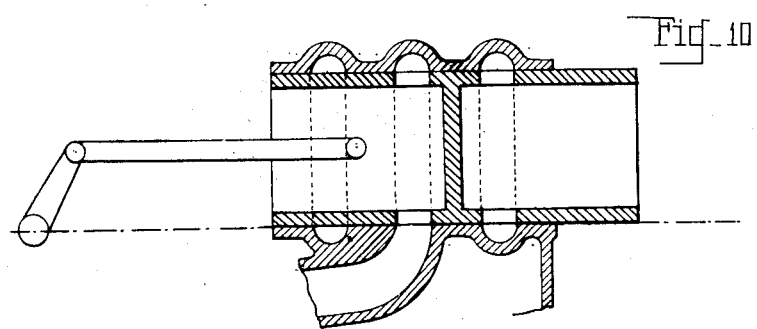
Figure 11:
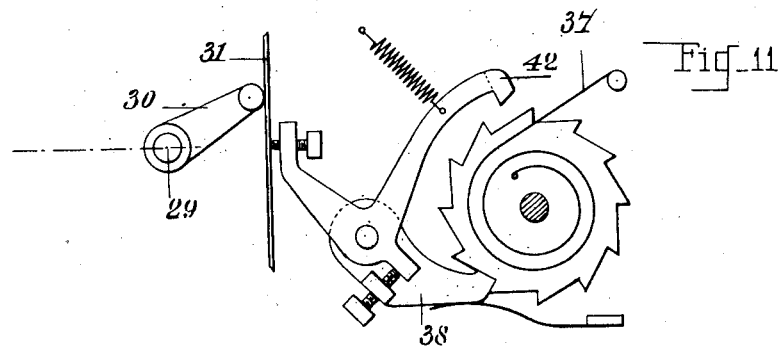
Figure 12:
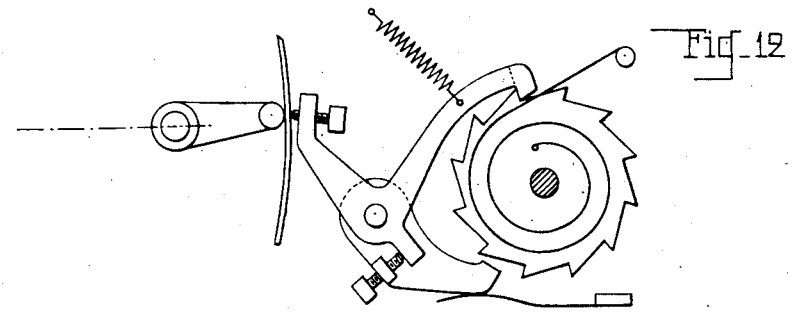
Figure 13:
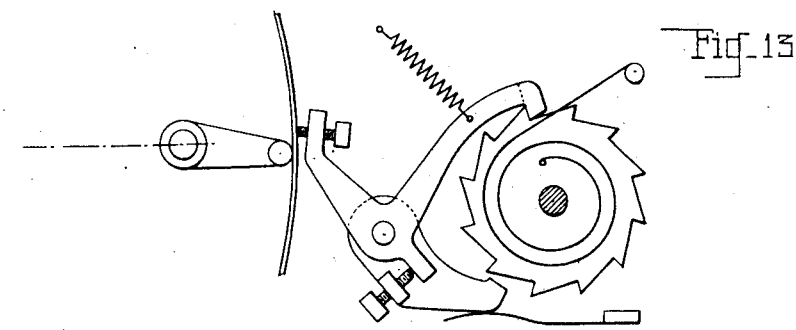
Figure 14:
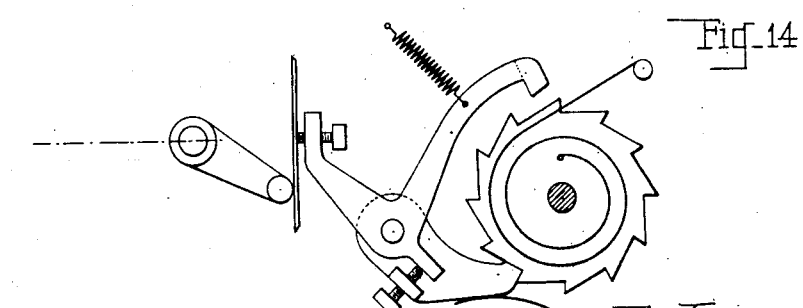

By virtue of this expansion, the piston valve will proceed from its position Fig. 8 into the successive positions shown in Figs. 9 and 10, and will be finally stopped in the position Fig. 10 due to the return to initial position of the spring strip 31 acting upon the arms 28 and 30. The arms 28 and 30 are keyed on the axis 29; the piston valve in Fig. 10 is at the end of its stroke on the right. Any return towards the left of this latter leads to a rotation in a counterclockwise direction of the arm 28 and therefore of the arm 30, which is fast on the axis 29, controlled by the arm 28. This rotation of the arm 30 will bring about the bending of the spring strip 31 (whose action at this moment is at the maximum on the axis 29). The piston valve is therefore stabilized in this position until the moment that the pressure becomes sufficiently great in the measuring chamber to overcome the said spring strip 31. At this time the measuring chamber 1 will be connected with the chamber 11 for the admission of liquid, and the liquid in the measuring chamber 2 will flow out through the discharge conduit 16.

This discharge is facilitated by the continuation of the expansion of the air in the compression chamber 24, to which action is added the discharge of the air from the chamber 1 into the chamber 2, this air being expelled by the liquid which is gradually admitted into the chamber 1.

As regards the general functioning of the meter itself, it will be noted that this is characterized by a displacement of a single element, i. e., the piston valve, under the pressure of the liquid itself, until said valve attains the dead centre, thus preventing all further action of the feeding pressure; at this time, the pressure of the air compressed in an auxiliary chamber is substituted for the feeding pressure in order to provide for the further motion of the piston valve, this motion being completed and the device being also stopped at the end of the stroke and maintained in this position by the action of the spring strip 31 which serves to hold the said valve in one or the other of its extreme positions.

All leakage of the liquid is obviated at the piston valve, which would cause a continual discharge of drops at the exterior, by the overflow device used in connection with the chamber 11. When the said pointer is upon a division other than zero, i. e. when the apparatus is discharging liquid, the valve 13 being open, the aperture 35 will be closed by the shaft 14 and the chamber 11 will be closed. But when the pointer is at zero, the whole of the liquid in the annular chambers 8 and 9, as well as the liquid in the chamber 11, will be discharged into the pipe 16 as far as the level of the horizontal plane passing through the upper end of the aperture 35.

At this time, the apparatus is entirely empty, and all leakage which might occur from the fact that the piston valve leaks internally, due to the play between said valve and its bore in the chamber 3, will hence be eliminated.

The following points are to be noted:

1. The volume of the chambers 21 and 22 is added to the volume of the measuring chambers 1 and 2, since during the gauging or measuring action i. e. at each release, the volume of the liquid discharged from the apparatus is equal to the volume of the measuring chamber added to that of the corresponding chamber.

2. The calculated volume of the compression chambers 23 and 24 may be advantageously changed so that the elastic pressure exerted when the liquid acts upon the balls (or floats) shall not be sufficient in itself to move the said piston valve. This motion is started by the pressure of the feeding liquid as far as the dead centre, this pressure being then absent; the expansion of the air in the compression chamber will now maintain a residual pressure in the measuring chamber, even though there is no connection between said chambers and the feeding pipe. This residual pressure serves to complete the motion.

3. The air which is circulated from one measuring chamber into the other is equal to the volume of liquid measured at each operation, less the volume of the auxiliary chambers 21 and 22.

4. At the exact moment at which the liquid enter in one of the measuring chambers (for instance the chamber 2) raises the float 17, the second measuring chamber should be empty, since there has been circulated into the said chamber a quantity of air which is equal to the contents of the chamber, and further, the air in the compression chamber 23 has already expanded. But it is still necessary to supply to the chamber 2 a volume of liquid equal to the contents of the chamber 22. This supply circulation has been purposely delayed, in order that one chamber may be entirely emptied before the second chamber is completely filled.

5. The initial expansion of the air will aid in producing a violent discharge of the liquid in the discharge conduit, thus increasing the output of the apparatus when the said conduit has points occupying a low position.

6. In order to avoid any loss of the leakage of liquid in the emptying pipe 16, the said liquid coming from the filled chambers and oozing out between the piston valve 4 and its cylindrical seat during a long period of inoperation of the apparatus, the hole 35 has been provided through which the liquid returns to the chamber 11. Furthermore, the said piston valve may be replaced by a pivoting shutter (Fig. 18) serving the same purpose as the former. Herein the shutter valve 64 is pivoted upon the liquid admission conduit 65 and may occupy two symmetrical positions relatively to the centre line V—V. The liquid is discharged through the conduit 66; the liquid is admitted to the two measuring chambers 67 and 68 by the respective ports 69 and 70 formed in the said valve and the ports 71 and 72 formed in the admission conduit.

Obviously, the compression chambers hereinbefore described may be disposed in any other suitable manner, and various modifications to this effect are shown in Figs. 15, 16 and 17.

In Fig. 15, the chambers 21 and 23 of Fig. 1 are replaced by the respective chambers 50 and 51 provided in a movable member which is substituted for the float 18 of Fig. 1. The liquid entering at the bottom of the measuring chamber 1 will raise the whole device after the manner of a float, and will then enter the chamber 50, compressing the air therein, up to the moment when the liquid raises the ball valve to close the entrance to the chamber 51. At this moment the piston valve is displaced under the effect of the sudden rise in pressure caused by the abrupt arrest of flow of the liquid as it completely fills the receptacle.

Fig. 16 shows another modification, in which the chambers 21 and 23 of Fig. 1 are replaced by the respective chambers 52 and 53, and the ball valve by the float 54. At the moment when the liquid raises the float 54 against its seat a sudden rise in pressure is produced which moves the piston valve.

Fig. 17 is a modification which has for its object to diminish the volume of the compression chambers; herein the compression is effected concurrently by the liquid entering the measuring chamber and by an auxiliary air pump. For this purpose the air pump 55 is provided with two distinct discharge valves 56 and 57, situated at the ends of the respective discharge conduits which lead to the chambers 58, 59. The bottom aperture in each of the said chambers is controlled as in the preceding case by means of balls or floats 60, 61, the space between the seating of the floats 62, 63 and the balls 60, 61 constitutes the auxiliary measuring chambers which serve the same purpose as the chambers 21, 22 of Fig. 1;

During the operation, as long as the floats 62, 63 are not raised, the air supplied by the air pump is divided between the two measuring chambers, and the common conduit 19 balances the pressures in the two measuring chambers. As soon as the liquid entering the chamber 2 (for instance) raises the float 63, the compression chamber 59 then receives the air compressed between the level a—b and the ball 61, this air being forced out by the liquid which continues to enter the measuring chambers 2 and the air pump. The supply from the air pump will cease when the pressure in said chamber 59 exceeds the maximum pressure which can be furnished by the air pump 55, which latter depends upon the inoperative space in the air pump and the force of the discharge valve springs 57.

The said arrangement is also self-regulating since at the critical moment, which is the one just preceding the release, the whole amount of the air from the air pump is supplied precisely on the side of the measuring chamber which is being emptied.

Having now particularly described and ascertained the nature of my said invention and in what manner the same is to be performed I declare that what I claim is:

1. In apparatus for measuring liquids, two receptacles each of definite capacity having inlet and outlet conduits, the former communicating with a source of liquid under pressure, distributing valve mechanism controlling said conduits for allowing the alternate filling of said receptacles by the liquid under pressure and the discharging of said liquid from said receptacles, said mechanism including a pressure actuated distributing valve, movable responsively to liquid pressure in the one or the other of said receptacles upon the complete filling thereof, a venting conduit for discharging atmosphere displaced by the incoming liquid, liquid level responsive means for closing said conduit, means associated with each receptacle for receiving a body of air during the filling of the respective receptacle, means forming a compression chamber associated with the air trapping receiving means and wherein the received air is displaced and compressed by the rising liquid after the closing of said vent by said liquid level responsive means, a valve controlling the displacement of said received air, said valve being closed when reached by said rising liquid, the closing of said valve by preventing further movement of the liquid column from said source to said receptacle suddenly building up in the latter the pressure to the value at which the distributing valve moves, the initial movement of said distributing valve in response to said pressure value being continued past the point of closure of said conduits by expansion of the compressed fluid in said compression chamber, the pressure of said expansion carrying said distributing valve to a position in which the discharge conduit for the filled receptacle and the inlet conduit for the other receptacle are simultaneously opened.

2. In an apparatus as in claim 1 in which said air receiving means comprises an auxiliary receptacle firmly located within said measuring receptacle and communicating therewith at its base, said auxiliary receptacle supporting the air compression chamber and communicating therewith by means of said air controlling valve.

3. In an apparatus as in claim 1 in which said air receiving means comprises an auxiliary receptacle located within said measuring receptacle and communicating therewith by its base, said auxiliary receptacle supporting the air compression chamber and communicating therewith by means of said air controlling valve.

4. In an apparatus as in claim 1 in which said air receiving means comprises an auxiliary receptacle communicating therewith by its base, said auxiliary receptacle supporting the air compression chamber and communicating therewith by means of said air controlling valve.

5. In apparatus as in claim 1, a spring, means operatively connecting said spring with said distributing valve, said spring being arranged to actuate said distributing valve when the latter is near the ends of its stroke, for ensuring the distributing valve attaining each time, its extreme positions in its range of travel, said spring being inactive in the intermediate position of said distributing valve.

6. In apparatus for measuring liquids, two receptacles each of definite capacity having inlet and outlet conduits, the former communicating with a source of liquid under pressure, distributing valve mechanism controlling said conduits for allowing the alternate filling of said receptacles by the liquid under pressure and the discharging of said liquid from said receptacles, said mechanism including a pressure actuated distributing valve, movable responsively to liquid pressure in the one or the other of said receptacles upon the complete filling thereof, a venting conduit for discharging atmosphere displaced by the incoming liquid, liquid level responsive means for closing said conduit when the liquid in the said receptacle has approached said level, means associated with each receptacle for trapping a body of air during the filling of the respective receptacles, means forming a compression chamber associated with the air trapping means and wherein the trapped air is displaced and compressed by the rising liquid after the closing of said vent by said liquid level responsive means, a valve controlling the displacement of said trapped air, said valve being closed when reached by said rising liquid, the closing of said valve by inhibiting further movement of the liquid column from said source to said receptacle suddenly building up in the latter the pressure to the value at which the distributing valve moves, the initial movement of said distributing valve in response to said pressure valve being continued past the point of closure of said conduits by expansion of the compressed fluid in said compression chamber transmitted through said valve, the pressure of said expansion carrying said distributing valve to a position in which the discharged conduit for the filled receptacle and the inlet conduit for the other receptacles are simultaneously opened, a spring, means operatively connecting said spring with said distributing valve, said spring being arranged to actuate said distributing valve when the latter is near the ends of a stroke, for ensuring the distributing valve obtained each time, its extreme positions in its range of travel, said spring being inactive in the intermediate position of said distributing valve, and said valve mechanism including means for setting said spring in potential position, responsive to the pressure which initiates the conduit closing movement of said distributing valve.

MARIO CARBONARO.